Patented Oct. 15, 1935

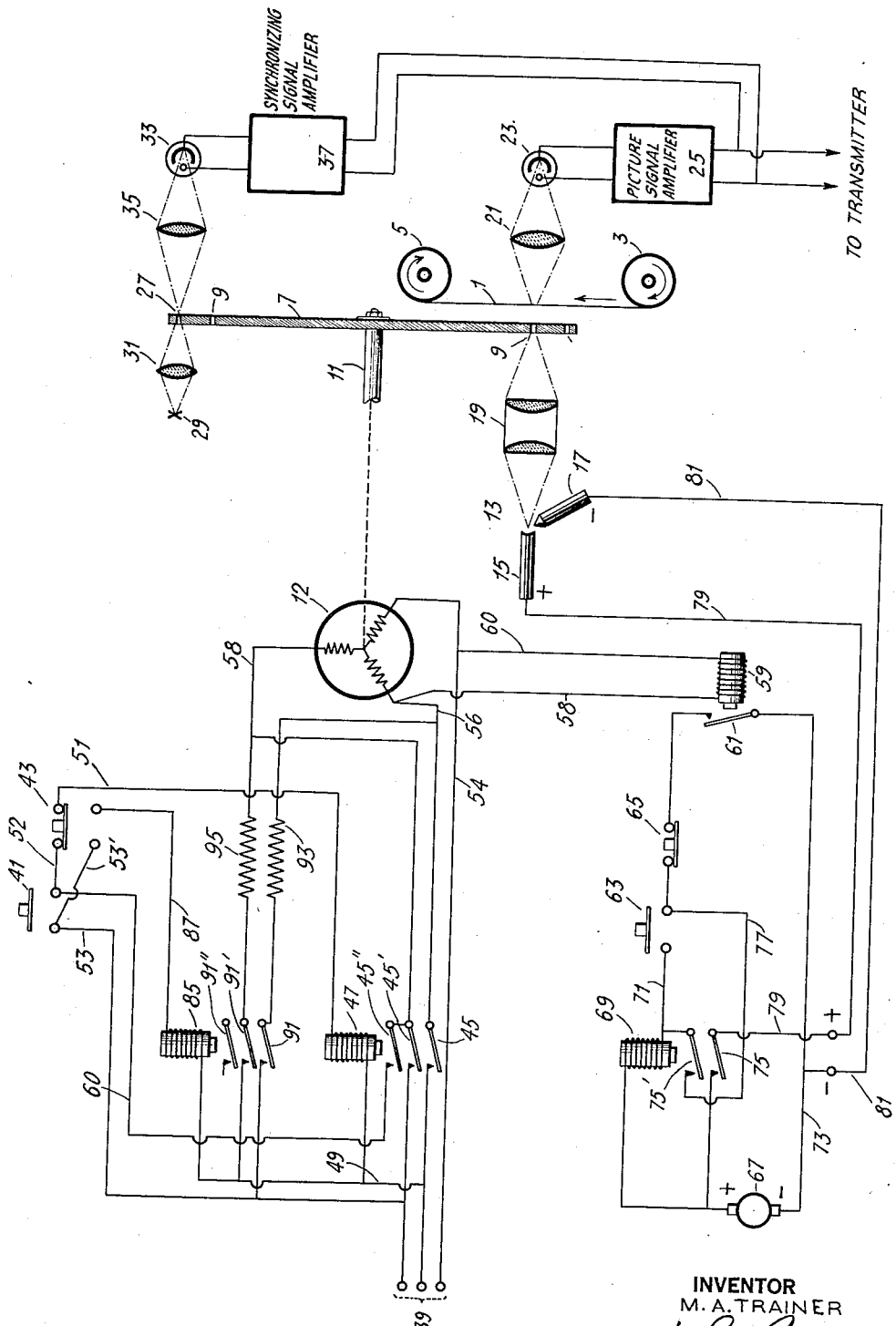

2,017,136

UNITED STATES PATENT OFFICE 2,017,136

TELEVISION SYSTEM

Merrill A. Trainer, Westmont, N. J., assignor to Radio Corporation of America, a corporation of Delaware Application June 25, 1932, Serial No. 619,169

7 Claims. (Cl. 178—6)

The present invention relates to television systems and particularly to television systems wherein an arc source of illumination is arranged to illuminate the subject of which an image is to be transmitted and converted at various points of reception into an electro-optical duplicate of that appearing at the point of transmission.

It is frequently necessary to stop the operation of the scanning due to necessary interruptions in the program transmission. If interruption in the program should occur, the arc which illuminates the scanning element in such manner that the light issuing from the arc may be caused to impinge upon successively elemental areas of the subject scanned, should be quenched instantly upon interruption or serious damage will result to the scanning element. This is because of the fact that the type of arc which must be used to obtain a sufficient amount of illumination of the subject, because of the relatively short time period of illumination, uses a very heavy current and consequently generates a considerable amount of heat. This heat, if permitted to influence any particular section of the scanning element for more than a very short time period, is sufficient to warp the scanning element to a point where it is no longer utilizable as such. If the scanning element has once become warped and use thereof is continued it has been found that the resulting image transmission will no longer be accurate but will become distorted to a degree corresponding to the degree to which the scanning element has been warped.

Therefore, it is an object of the present invention to provide ways and means by which the arc used for illuminating the subject of which an image is to be transmitted may be quenched at the same instant that the driving power for the scanning element is removed.

The substantially simultaneous disconnection of the driving source for the scanning element is more frequently necessary in connection with image transmissions of motion picture films or the like than when scanning or analyzing other subjects because in the transmission of film or the like difficulties are frequently encountered because of film breakage, burning of the film and similar inconveniences. In order to repair the film and not necessitate a loss of a considerable amount of the action portrayed by the film subject or to disrupt completely the framing adjustment thereof within the transmitting device, it is desirable that the scanning element be stopped whenever the film is stopped.

A further object of the invention is to provide ways and means operating in combination with an arc quenching device for stopping instantly the rotation of the scanning element at times to be desired.

Still other and further objects of the invention will become apparent and at once suggest themselves to those skilled in the art to which the invention relates by considering the single figure of the accompanying drawing in connection with the following specification and claims.

To refer now to the drawing, the film subject 1 which is assumed to be scanned for transmission purposes is shown as being unwound from a film storage reel 3 onto a film storage reel 5 and to be moved relative to the scanning element, preferably at constant speed although intermittent motion may be adapted where desired, in the direction shown by the arrow.

To analyze the film, a rotary scanning element 7 provided with a series of apertures 9 extending substantially around the entire circumference of the scanning element are arranged on equal radii, assuming constant speed film motion, so that as the element 7 is driven by means of a shaft or spindle 11 connected with a motor 12 of the synchronous type, the successive apertures 9 will trace parallel paths across the film subject 1, and as the film is advanced in the direction shown by the arrow, successive apertures 9 passing transverse to the film will cause different successive elemental strips to be scanned.

To illuminate the film, an arc source 13 formed from the usual carbon electrodes 15 and 17 is arranged to direct the issuing light to a condensing lens system 19, for example, which directs the light through the apertures 9 on the scanning element so that light which passes beyond the film 1 and is varied in intensity in proportion to the varying intensities of light and shadow on successive elemental areas of the elemental strip scanned will impinge upon the lens element 21 to be focused upon the light sensitive photo tube 23. The resulting currents flowing through the photo tube 23 which vary in intensity in proportion to the varying intensities of light and shadow on the picture record 1 are then amplified in any suitable manner by the picture signal amplifier 25 and impressed upon any suitable form of transmitting arrangement from which point they are distributed by radio or wire where desired to various remotely located points of reception.

Simultaneous with the transmission of the picture signalling impulses, provision is made for sending a synchronizing or framing indication. This is accomplished also by light sensitive methods and a suitable light source 29 directs the issuing light by way of a lens element 31 to focus upon a series of apertures 27 of the scanning element which are arranged concentrically with the scanning apertures 9 which are also on equal radii. This impulse may occur after the scanning of each elemental strip of the picture record on the film 1 and prior to the start of scanning of the succeeding strip. The light thus passing through the synchronous apertures 27 of the scanning element 7 is focused upon a second light sensitive tube 33 by a lens element 35. The signals are in all cases of substantially the same amplitude and are amplified in any suitable manner by a synchronizing signal amplifier 37 from which they are directed to the same point of transmission as the picture signals.

It has already been explained in the copending application of A. W. Vance, filed June 17, 1931, Serial No. 544,959, that it is desirable to maintain a predetermined phase relationship between the picture signals and the synchronizing signals. This phase relationship is preferably a shift of 180 degrees between the picture and the synchronizing signals so that it is relatively simple to make a selection between the picture and the synchronizing signals at the point of reception and also so that it is possible by virtue of the phase difference between the signals to produce at the point of reception the effects of black picture reproduction by the synchronizing impulses, and to use these synchronizing impulses at the same time to maintain the desired synchronization. This type of transmission is found most convenient when using a cathode ray tube to produce an image of the subject located at the point of transmission. With unilateral or one way scanning, which is necessary in the cathode ray tube when using a rotary disk as a scanning element at the transmitter, a saw tooth wave is generated by the synchronizing medium at the receiver for the control of the ray path to cause the ray to trace a light path for a return line unless the synchronizing signals produce the same effects as a black picture signal upon the cathode ray. These synchronizing signals thus serve also to prevent observation of any return line in the reproduced picture or electrooptical image.

This invention is not intended to cover specifically the arrangement herein above disclosed but only the application of such arrangements to systems wherein an arc source of illumination is used and systems wherein the driving power for the disk may be supplied or disconnected practically instantaneously. To describe one of the many systems which might be used, it is seen from the drawing that for the purpose of starting the motor 12, which is preferably of the synchronous three-phase type, the three-phase current is supplied to the terminals 39 and a suitable controlling button 41 is used to start the motor and a similar control button 43 is used to stop the motor. To start the motor it is necessary that the relay contacts 45, 45' and 45" be closed in some suitable manner by means of the relay winding 47. This closure of the relay armatures is preferably accomplished by connecting a conductor 49 with one of the supply terminals and one end of the relay winding 47, and then, to the other end of the relay 47 a conductor 51 is connected. Conductor 51 connects to one of the upper or "off" position terminals of the "off" button 43. The "on" button 41 and the "off" button 43 of the system are normally arranged so that each is spring-pressed upwardly so that with the start or "on" button 41 being depressed the current path from the conductor 51 to the upper contact of the "off" or stop button 43 continues through the conductor 52, the "on" button 41 now having been depressed, to the conductor 53 and back to the opposite side of one phase of the impressed current. The various relay contacts 45, 45', 45" now having been closed due to relay winding 47 being energized, energy is supplied to the driving motor 12 through the conductors 54, 56 and 58, so that the motor 12 is rotated.

As energy is supplied to the motor by the depression of the "start" button 41 the relay winding 47 is caused to become energized to close the various relay contacts and with the series of relays closed the contact 45" connecting with the contact 45' causes a circuit to be completed through the conductor 60, one of the lower terminals of the start button 41, the conductor 52, the upper terminals of the "off" or stop button 43, and the conductor 51 back through the relay winding 47 and through conductor 49 to the supply so as to complete a circuit across one phase of the input. Thus, it is seen that it is no longer necessary to maintain the start or "on" button 41 in depressed state for the motor, once having been started, will continue to run until the circuit causing the relays 45, 45' and 45" to remain closed is broken, which is, of course, accomplished by depressing the "off" or stop button 43 so that it rests against the lower two contacts thereof. This depression of the stop button 43, it will be seen, breaks the circuit serving to hold the relay winding 47 energized. In addition, as the stop button 43 is pressed against the lower contacts 35 thereof energy flows through the conductors 53 and 53' to one of the lower terminals of the "off" button, and by virtue of completing a circuit through the button itself and the conductor 87 to the relay winding 85 and the conductor 49, it is seen that the armatures 91, 91' and 91" are closed. The armatures 91 and 91' have connected in series therewith resistor elements 93 and 95. Closure of the relay armatures 91 and 91' serves to reverse the direction of supply of one phase of the three-phase energy supply to the motor 12 and thus produces a braking action on the motor so that it is slowed and stopped substantially at the instant of pressing the "off" or stop button 43.

So long as the motor 12 is maintained in running position energy is supplied to the relay winding 59 which is connected by conductors 58 and 60 across one phase, including conductors 54 and 56, of the input to the motor 12. This relay winding 59 will remain in an energized state so long as the motor is running. Now, however, supposing that the stop button 43 is depressed so as to cause the relay winding 47 to become de-energized, it is seen that this action will cause the relay armature 45 to open and interrupt instantly the current flow through the relay winding 59, and this current flow will not again appear until the relay winding 47 is again energized. Assume now, for example, that the relay 47 is energized so as to cause the armatures 45, 45' and 45" to be in closed position, it will be seen that the relay winding 59 is also energized and this will cause the relay armature 61 to close.

Thus, the disk is in operating position and rotating relative to the arc 13. At this time it is desirable that the arc be caused to glow. This may be done by means of a start button 63 which is arranged adjacent a stop button 65 which is normally closed. The start and stop buttons are arranged in series with the relay armature 61 and a source of current 67 (preferably direct current). With the start button 63 now depressed, and still assuming that the armature 61 is closed, it is seen that current can flow through the relay armature 69, the conductor 71, the start button 63, the stop button 65, the relay armature 61 and conductor 73 back to the source. This causes the relay armature 75 and its holding contact 75' to become closed. The start button 63 may now be released, and although it will open the circuit originally traced by which the relay armature 69 becomes energized, it is to be noted that the holding contact 75' arranged to cooperate with the relay armature 75 is adapted to close a circuit including conductor 77 which connects with the stop button 65 so that the same circuit path will, in effect, be maintained, and until the stop button is depressed the relay winding 69 will continue to be energized.

As the relay armature 75 is closed, it is seen that the source of direct current 67 may now connect through the relay armature 75 and the conductor 79 with the positive electrode 15 of the arc and the negative side of the source 67 may connect by way of the conductors 73 and 81 with the negative electrode of the arc source, so that the arc is maintained in a glowing state so long as the relay 69 is kept energized.

In order to extinguish the arc either of two conditions may be fundamental in bringing about this result. These may be that the stop or "off" button 65 is released or depressed so that the circuit including the source 67 and the relay armature 69 is broken which causes the relay armature 75 to open and the circuit to operate the arc thus broken, or the result may be accomplished by stopping the motor 12 through depression of the "off" or stop button 43 so as to cause a delay in the current through the relay armature winding 59 and thus cause the armature 61 to open and break the same circuit to include the winding 69.

From the above it is seen that an arrangement which is substantially fool-proof has been provided by which it is possible to produce an interlocking between the driving of the disk and the ignition of an arc. Furthermore, it is seen that it is impossible to operate the arc unless the motor is running because while the motor is stopped the armature 61 is always open and depression of the start button will have no effect in causing the arc to glow. Therefore, it is only after the motor has once started by depressing the start button 41 and the relay 61 has closed that it is possible to depress the start button 63 to produce any useful result.

Having thus described my invention, what I claim is:

1. In a television system, a rotary scanning element, an arc source of illumination for illuminating a subject, of which the image is to be transmitted, at successive elemental areas during the rotation of said scanning element, means for rotating said scanning element to cause the light produced by said arc to pass through elemental scanning areas of the scanning element to traverse successive adjacent paths of the subject of which the image is to be produced, and a plurality of relay means of which at least one is connected with the rotor of the scanning element rotating means and each relay being inter-connected with the other to cooperate with the other for controlling the scanning element rotating means and the arc source of illumination in accordance with the current flow through the rotor means so as to quench the arc at a time period simultaneous with periods of stopping of rotation of the scanning element rotating means.

2. In a television system, a rotary scanning element having a plurality of individual scanning areas thereon, an arc source of light arranged to be projected by the rotary scanning element to traverse successive elemental areas of successive adjacent elemental strips of a subject of which the image is to be reproduced, means for rotating the scanning element, means for stopping instantly at a predetermined time of selection the rotation of the scanning element and a relay means connected with said motor and controlled by the current flow through a portion of the motor windings so as to be operative at time periods when the motor stops for quenching the arc source of illumination.

3. A scanning system comprising a rotary scanning element, a subject of which the image is to be produced, an arc source of illumination for illuminating said subject along successive elemental areas through said rotary scanning element, a driving motor for rotating said scanning element, means to supply current to said arc to ignite the same only at time periods when said scanning element is rotating, relay means operative in accordance with the current flow through the driving motor for quenching said arc upon stopping the rotation of the driving motor and a second relay operating independently of the rotation of the driving motor for quenching the arc upon actuation.

4. In a television system, a rotary scanning element, an arc light for illuminating successive elemental areas of a subject of which the image is to be transmitted during the rotation of said scanning element, means for rotating said scanning element to cause the light produced by said arc to traverse successive adjacent paths of the subject of which the image is to be produced, and a plurality of cooperative and interlocked relay means operating through the rotor of the scanning element driving means for simultaneously quenching the arc and stopping rotation of the rotor winding of the scanning element upon actuation.

5. In a television system, a rotary scanning element having a plurality of individual scanning means arranged along a predetermined path thereon, an arc source of light arranged to be projected upon the scanning means of the rotary scanning element to traverse successive elemental areas of successive adjacent elemental strips of a subject of which the image is to be reproduced, relay means for controlling the rotation of said scanning element, and relay means interlocked with the arc and the rotor winding of the scanning element drive means for stopping instantly at a predetermined time of selection the rotation of the scanning element and simultaneously quenching the arc source of illumination whereby the heat generated by the arc is unable to warp the scanning element.

6. A television system comprising a scanning disk, a high intensity light source, a multi-phase synchronous motor for rotating the disk at substantially constant speed, relay means operable to start and maintain the said motor rotating, independent relay means operable to disconnect at least two phases of the source of driving energy from the motor to retard the motor, relay means adapted to reverse the current in a different phase of the supply energy to the motor to stop rotation immediately upon actuation of the first relay means, and relay means actuated by rotation of the motor for extinguishing the light source.

7. A scanning system comprising a source of illumination, a rotary element through which light from the source is adapted to pass at predetermined selected time intervals, a driving motor for rotating the scanning element, a plurality of relay devices for starting and stopping the driving motor, a second relay system for controlling the source of illumination, and a third relay system controlled from said motor for exerting the secondary control on the second relay system whereby upon operation of any of the relay systems the light from the source of illumination is extinguished and upon operation of the first relay system the motor is started and stopped.

MERRILL A. TRAINER.